United States Patent
Amundsen et al.

(10) Patent No.: US 6,772,052 B1
(45) Date of Patent: Aug. 3, 2004

(54) SYSTEM FOR CONTROLLING POWER CONSUMPTION AT A USER OF ELECTRIC POWER

(75) Inventors: Joe Amundsen, Harestua (NO); Erik Teigen, Nesøya (NO)

(73) Assignee: IT & Process AS, Billingstad (NO)

( * ) Notice: Subject to any disclaimer, the term of this patent is extended or adjusted under 35 U.S.C. 154(b) by 0 days.

(21) Appl. No.: 09/647,873
(22) PCT Filed: Apr. 7, 1999
(86) PCT No.: PCT/NO99/00117
§ 371 (c)(1),
(2), (4) Date: May 1, 2003
(87) PCT Pub. No.: WO99/52194
PCT Pub. Date: Oct. 14, 1999

(30) Foreign Application Priority Data

Apr. 7, 1998 (NO) .......................................... 19981605

(51) Int. Cl.⁷ ........................ G01R 21/06; G05B 15/02
(52) U.S. Cl. ...................... 700/291; 700/286; 700/297; 307/35
(58) Field of Search ............................... 700/286, 291, 700/295, 297; 307/35, 38, 39, 126

(56) References Cited

U.S. PATENT DOCUMENTS

| 3,906,242 | A | | 9/1975 | Stevenson |
| 4,213,058 | A | | 7/1980 | Townsend |
| 4,489,386 | A | | 12/1984 | Breddan |
| 5,696,695 | A | | 12/1997 | Ehlers et al. |
| 5,963,457 | A | * | 10/1999 | Kanoi et al. ................. 700/291 |
| 6,061,609 | A | * | 5/2000 | Kanoi et al. ................. 700/291 |
| 2003/0083788 | A1 | * | 5/2003 | Harada et al. .............. 700/291 |
| 2003/0163224 | A1 | * | 8/2003 | Klaar et al. ................. 700/286 |

* cited by examiner

Primary Examiner—Leo Picard
Assistant Examiner—Douglas Lee
(74) Attorney, Agent, or Firm—Banner & Witcoff, Ltd.

(57) ABSTRACT

The invention relates to a system for controlling power consumption at a user of electric power, especially a dwelling supplies with power from a power plant. The invention is characterized in that the control unit is a main unit arranged to control the power consumption also based on an estimate of a historical consumption pattern at the user, so that the instantaneous consumption is reduced both in the periods in which the power load at the user is highest, and in the periods in which the historical consumption pattern of the user dictates that there is a high load, and that the main unit user is arranged to distribute the power consumption by means of a random function distributing the connection of the power consuming units over a given time interval, the random function being independent of energy plants and other users.

5 Claims, 3 Drawing Sheets

SYSTEM FOR CONTROLLING POWER CONSUMPTION AT A USER OF ELECTRIC POWER

BACKGROUND OF THE INVENTION

The invention relates to a system for controlling power consumption at a user of electric power, especially a dwelling supplied with power from a power plant, comprising a control unit installed at the user and having a programmable memory for storage of data for controlling the power consumption, parameter-sensing sensors for the supply of input signals to the control unit, an electric meter communicating with the control unit for measuring the total instantaneous consumption of the user, and a number of addressable function nodes connected between the control unit and the various loads and being in both-way communication with the control unit, for connection and disconnection of power-consuming units under the control thereof, the memory of the control unit containing a program for controlling the power consumption based on an estimate of the instantaneous consumption, and the control unit being arranged to transmit addressed messages to the function nodes, so that only the nodes with the correct address receive the current messages and execute load-affecting actions based on the message content, to thereby reduce the instantaneous consumption.

For dwellings and households there have been launched, during the later years, a number of energy-economizing products and systems reducing the consumption of electric energy for the household. Generally, these systems are based on temperature or sequence control of electric appliances used for heating, for instance electric heating stoves. In this manner the power consumption is reduced at the end user, but the power consumption is not reduced during the period in which the load is largest.

Statistical data regarding the energy consumption in private households show that there is a higher consumption in some time periods during the day. These time periods are in the morning hours and in the afternoon/evening, respectively, and more specifically in the periods 6–10 and 16–23. Within a distribution area, the power load in the morning hours may rise from e.g. 825 MW to about 1100 MW around 8 o'clock, to sink thereafter before a new peak occurs in the evening around 19 o'clock. The most important thing is not the time at which the load peaks occur, but that they appear at intervals with a high degree of regularity in the course of the morning hours and the afternoon/evening. The load profile is approximately equal through the whole year, a normal year being assumed, i.e. that there are no extreme changes in temperature or in the prices of electricity.

From the collected statistical data, the energy plants know the load histories and prognosticate future consumption from predefined consumption curves and within given safety margins.

Today there exist different types of systems in which the power consumption at the subscribers of a power company is controlled. The traditional "Demand Side Management" or DSM method is based on two-way communication between energy supplier (energy plant) and subscribers. In these systems, the framework conditions and the parameters for how the consumption in the dwelling of the subscriber is to be controlled, are set by the power plant. This method has the weakness that the system is based on often occurring input of regulating control data from the power company. These control data then will be based on the consumption pattern of the total subscriber mass of the power company. This consumption pattern may, however, deviate strongly from the consumption pattern of the individual household, so that the achieved control of the power consumption in many cases will not be optimal, considered in relation to the consumption pattern and the current power consumption at the individual subscriber or user.

Several other known methods and systems remedy this weakness, either intendedly or unintendedly, by putting in control mechanisms seeking an optimum local control at the subscribers. As examples hereof, reference can be made to U.S. Pat. Nos. 5,436,510, 4,510,398 and EP 0 717 487 A1 disclosing systems of the introductorily stated type. The local control according to these systems usually is based on said framework conditions which are given by the power company, but to a higher extent than traditional DSM control is able to secure a better utilization of the energy at the individual subscribers. Common to these systems is, however, that the dynamic load control limits itself to see to it that the power consumption at the subscriber does not exceed given maximum limits. The maximum limits may be set by the power company, or they may be set locally at the subscriber. The systems are quiescent as long as these limits are not exceeded. This means, for example, that if a given number of households at a given time lie closely under these limits, the collected total consumption for these households will be relatively high. U.S. Pat. No. 5,436,510 and U.S. Pat. No. 4,510,398 in addition describe devices seeking to add new loads as long as the total consumption is under the given maximum limit. In addition to said total consumption problems, this means that the subscriber hardly gets any pleasure from the power control with respect to energy saving.

SUMMARY OF THE INVENTION

On this background it is an object of the invention to provide a system distributing the power consumption at a subscriber even if the consumption at the subscriber does not exceed given maximum limits, so that, both locally at a subscriber and collectively in a larger user or subscriber mass, one achieves a more optimum power regulation and a smoother power distribution.

The above-mentioned object is achieved with a system of the introductorily stated type which, according to the invention, is characterized in that the control unit is a main unit arranged to control the power consumption also based on an estimate of a historical consumption pattern at the user, so that the instantaneous consumption is reduced both in the periods in which the power load at the user is highest, and in the periods in which the historical consumption pattern of the user dictates that there is a high load, and that the main unit is arranged to distribute the power consumption by means of a random function distributing the connection of the power-consuming units over a given time interval, the random function being independent of energy plants and other users.

In the system according to the invention the main unit is arranged to distribute the power consumption in the time periods around global and local high load by means of said random function which operates locally at a subscriber in such a manner that the power consumption is displaced a randomly chosen time interval, to flatten the local power consumption in addition to the collected or global total consumption for a whole user or subscriber mass as seen by the power company. In practice this means that one uses the "law of large numbers" to lower the power consumption in a larger transformer circuit with many connected subscribers. Thus, the system implies that several main units will appear in co-action without knowing about each other, and thereby keep the power consumption down on a global scale.

The system according to the invention from the starting point is not connected to an operating central, but is a stand-alone automatic control system monitoring and regulating the power consumption at the end user from a historical consumption pattern established by the end user/household during a previous time period, together with the instantaneous consumption, the temperature and other variable input signals.

Thus, the load distribution takes place locally in the household and is controlled by the main unit (hereafter also called "master") utilizing such parameters as temperature, instantaneous consumption and known consumption patterns to accomplish the distribution, based on said random function. This will take place without the comfort being changed in the household. Said parameters are run through a set of rules stored in the program of the master. The program works out prognoses and distributes the power consumption based on season, day of the week, time of the day, temperature, the power consumption at the moment and the power consumption over time. As mentioned, the system operates as a self-contained unit and is not connected to a power plant or an operating central. Primarily, the system is intended for use in households, business buildings and other buildings which, for some reason, have a need for releasing and stabilizing the power consumption, so that the load peaks are reduced.

If desired, the system may for example be connected to an operating central by means of, e.g., a both-way communication system. Since the system provides for automatic power release in high-load periods and the power is distributed over the hours around peak load, the load structure is flattened and gets smaller variations. The energy plants then can prognosticate the power consumption with a smaller risk, carry out cost-effective readings, reduce the network loss by means of a smoother load, and also connect the customer/subscriber to themselves by offering additional services.

BRIEF DESCRIPTION OF THE DRAWING

The invention will be further described below in connection with exemplary embodiments with reference to the drawings, wherein.

DETAILED DESCRIPTION OF THE EMBODIMENTS

Figure 1:
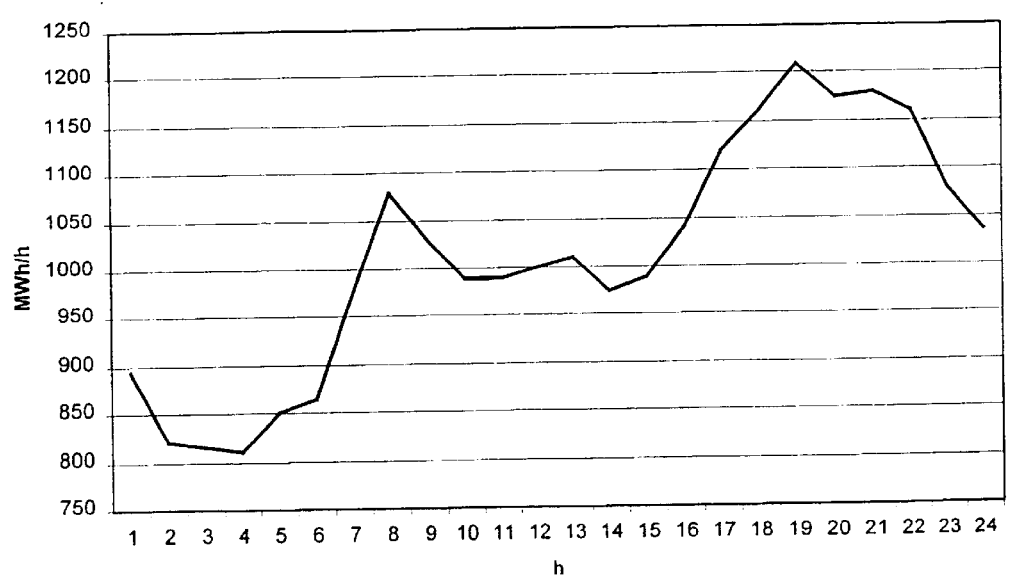
FIG. 1 is a diagram showing an example of a load curve, i.e. a curve showing the load within a network station area distributed over the 24 hours of the day.

FIG. 1 shows the total consumption for a number of end users within a network station or distribution area. The illustrated curve represent a "normal" consumption pattern for a user or subscriber group. Since the consumption pattern reflects a pattern of life, the load peaks may occur at somewhat different times according to where in the country the subscriber group lives. As appears form the figure, and as mentioned in the introduction, the load peaks occur during the morning hours and in the afternoon/evening, in dependence of the life pattern of the user group.

Figure 2:
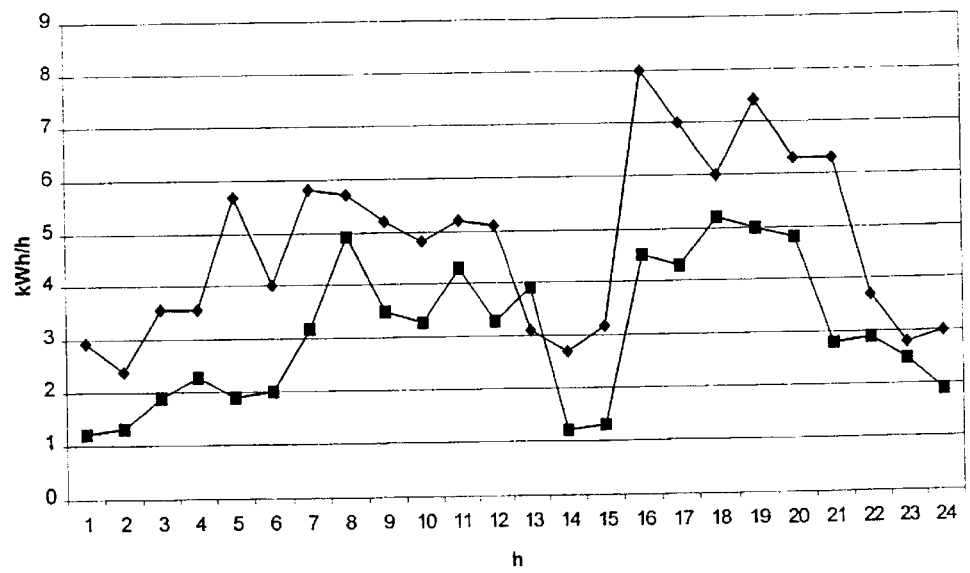
FIG. 2 is a diagram showing load curves of a household for two different days.

Each end user has his own consumption curve. An example of such a curve is shown in FIG. 2 showing load curves a and b for two different days. Each curve may be divided in that each individual power-consuming unit in e.g. a household has its own consumption curve. If the curves for a great number of end users are summed, one gets a curve approximately corresponding to the load curve in FIG. 1.

The life pattern of a household results in a consumption pattern stored in the master of the present system. This consumption may deviate strongly from the consumption pattern possessed by the great subscriber mass, or it may coincide with this consumption pattern during certain periods. This consumption pattern, which may be designated a historical consumption pattern, gives the main unit (master) a certain number of stored samples, so that it may recognize a consumption pattern and act with a smaller risk by monitoring and regulating given electric products.

In addition to the historical consumption pattern, the master has a learning function resulting in that it learns the life pattern of the household by remembering when the various electric products are used. Further, the master for example remembers that the household prepares dinner around 17.05 o'clock on weekdays. When the time approaches 17 o'clock, the master therefore expects that the energy consumption will rise considerably. Since it remembers this, it effects some actions before 17 o'clock, and postpones other actions to a later time, so that the peak load does not occur at the same time as for all other households/dwellings within a distribution area.

Figure 3:
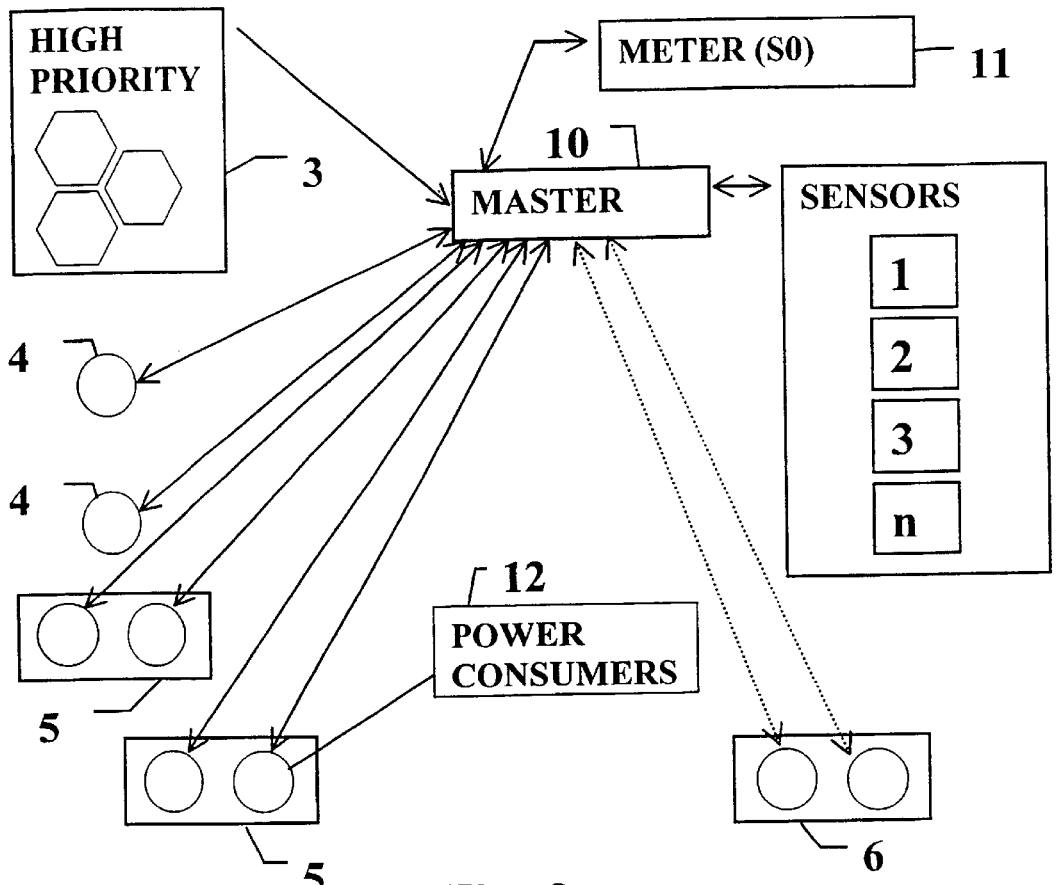
FIG. 3 is a block diagram illustrating the system according to the invention.

The block diagram in FIG. 3 illustrates the system according to the invention. The system may be designated an "electronic power limiter" and executes electronic dynamic control of the power consumption at an end user. The system comprises a main unit or master 10, an energy or electric meter 11, which is connected to the master via an S0 interface, a number of sensors 1, 2, 3, . . . n, and a number of function nodes which are designated 4, 5 and 6 and are connected between the master 10 and electric products, i.e. the power-consuming units to be controlled. These units in the figure are represented by a block 12, and are otherwise left out in the figure.

The various sensors 1 . . . n provide input signals to the master. These signals for example can be read temperature or other reading values, such as a water reading or the like.

The function nodes 4, 5 and 6 are nodes controlling high-power products. With high-power products there are meant products having a high power consumption at the moment. The nodes designated 6 are nodes having no direct influence on the peak load, because of the fact that the need is a relatively low power consumption when they are on.

The system also comprises electric products which are only monitored, and not controlled, and which are designated 3 in FIG. 3 and are illustrated as hexagonal symbols. For example, it is not desirable to control when a user may use the kitchen range, but it is desirable to monitor when the range is used, since this often indicates a consumption pattern. The fact that the user always uses the range (prepares dinner) during, e.g., a time period after 16.30 o'clock, will give the master an indication that other high-power products should be switched off in this period.

All the electric products which can be controlled or monitored, such as washing machine, kitchen range, percolator, water heater etc., can be categorized according to low, medium or high priority. Which products are registered in the different categories, varies from household to household, but the priority levels can be described as follows.

"Low priority" comprises products which can be disconnected in shorter periods, up to several times during the day, without the user noticing this change. Typical such products are water heater, heating cables and heating stoves.

"Medium priority" comprises products which can be disconnected in periods with peak load, especially in the periods 6–10 and 16–23. Typical such units may be individual lamps, freezer, asf.

"High priority" comprises products which are used continuously, or products which are wanted to be accessible at any time, and which in some cases have a high power consumption. These products are not to be controlled by any nodes, but are only monitored by reading of the power consumption. These are products like kitchen range, washing machine, drying tumbler, electric alarm clock, radio, asf.

Figure 4:
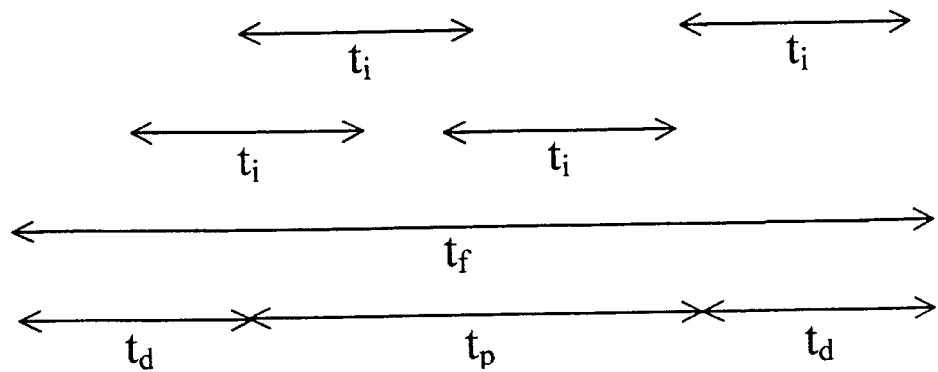
FIG. 4 illustrates the distribution of power consumption (load) over a time period under the influence of the random function.

The principle of distribution of load under the influence of the random function is shown in FIG. 4. The total time over which the load is distributed, i.e. the time interval for distribution of load, is designated $t_f$. There is nothing to prevent defining $t_f$ to apply to an infinitely large time interval, so that a load controlling function will always be present. The range of definition for peak load is designated $t_p$, whereas $t_d$ is the time period over which the peak load is to be distributed for and after the peak load period. Thus, one has $t_f=t_p+2\cdot t_d$. Incidental time intervals within the total time interval $t_f$ are designated $t_i$. A time interval $t_i$ is the period in which a power consuming unit is switched on. The random function comes into force within the time period $t_f$ and is applied to each individual unit being in both-way communication with the master. It assigns to each unit a random or incidental period in which the unit is to be switched off. When this period is over, the unit is switched on, or is allowed to be switched on in the time period with the length $t_i$. When the period $t_i$ is over, the random function is again applied to the unit which has been switched on. This is repeated for all units as soon as the time period $t_i$ for the individual unit is over.

As an example it is supposed that $t_i$=30 min, and that $t_f$=120 min at an arbitrary time of the day. Further, it is supposed that two power-consuming units 1 and 2 have been switched on before the entry into the distribution interval $t_f$. As the interval $t_f$ is entered, both units will be switched off, and the random function comes into force by randomly determining that unit 1 shall be switched off for 15 minutes, whereas unit 2 shall be switched off for 30 minutes. After 15 minutes have elapsed, unit 1 will be switched on, and it is noted that the $t_i$ interval for unit 1 has started. After additionally 15 minutes unit 2 is switched on, and it is noted that the $t_i$ interval for this unit has started. When now 15 minutes have elapsed, it will be discovered that the $t_i$ interval for unit 1 has expired since this unit now has been on for 30 minutes, and the unit is switched off. The random function then comes into force once more, and chooses a new time interval for how long the unit 1 shall be switched off, for example 10 minutes. After these 10 minutes, unit 1 is again switched on, and it is noted that still another $t_i$ interval has started for unit 1. It now lasts only five minutes before unit 2 is switched off, and the random function comes into force and chooses an incidental period for how long unit 2 is to be switched off. This will be repeated for all units in the system during the whole interval $t_f$. Locally, at a subscriber, the consumption then will get displaced, and one obtains both a power and an energy profit for the time in which the units are switched off. As regards the global power saving, one has that the arithmetic mean of a number of numerals is equal to the sum of the numerals divided by the number. If the numerals are extracted from a uniform distribution, such as done in the system according to the invention by means of the random function, all numerals must appear with the same frequency when the number of numerals approaches infinity. This means that the arithmetic mean is the sum of all numerals in the distribution divided by the number of numerals. A distribution from 0 to 30 will have a mean of $(0+1+2+\ldots+30)/31=15$. As an example in this connection, it is assumed that one has a great number of stoves controlled by the random function used in the system according to the invention. Further, it is assumed that all of these stoves yield 1000 W. If $t_i$ is 30 minutes and the random function chooses an incidental numeral between 0 and 30 as a disconnection interval, and if one has a control or distribution interval $t_f$ of 60 minutes, the saving will be $1000\cdot 15/60=250$ Wh. In addition, the load will be distributed quite smoothly over the whole time interval.

Figure 5:
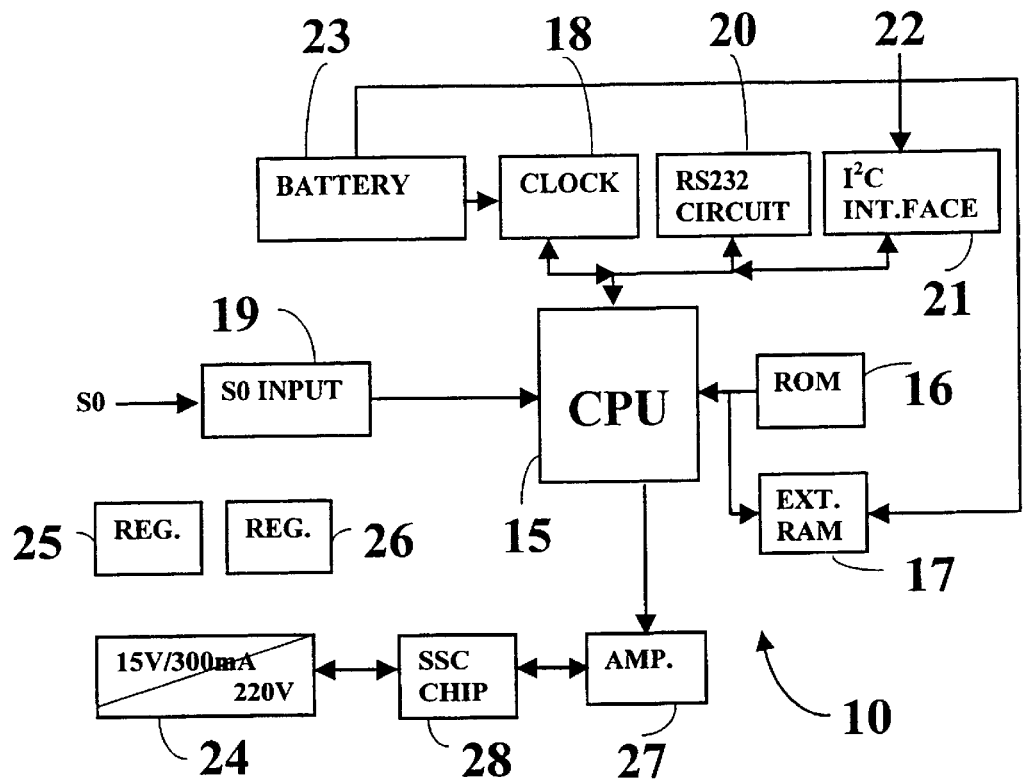
FIG. 5 shows a block diagram of the main unit (master) in the system according to the invention.

FIG. 5 shows a block diagram of the main unit or master 10. The master constitutes a node (junction) which is an intelligent unit which automatically monitors, controls and checks the consumption and the load structure in that it is supplied with measuring data from the electric meter and from the sensors of the system, and in that it has the possibility to exchange data regularly itself, without intervening manually and setting new parameters and other variables.

As appears from the figure, the master comprises an integrated processor unit (CPU) 15, a read only memory (ROM) 16, a random access memory (RAM) 17, a number of I/O cards and a clock 18 with real time and calendar. The I/O cards are shown to comprise an SO input circuit 19, an RS232 port 20 and an I²C interface 21. This interface comprises inputs 22 for the supply of signals from the various sensors in the system. In addition, there is provided a battery 23, a circuit 24 for galvanic division between the mains voltage (220 V) and a low-voltage supply circuit (15V/300 mA), and a pair of regulators 25 and 26 for the supply of DC voltages of 5 V and 12 V, respectively.

Communication between the master 10 and the electric product to be controlled thereby, takes place in that the master transmits messages/commands to the function node (4, 5, 6). The nodes constitutes receivers placed in the contact points between the relevant products and plug outlets in which the products are connected to the mains. Each message contains a special address which is addressed to one or more nodes, so that the nodes know who shall receive the message and react thereon. Further, the message contains information which is to assist the node in executing the correct actions.

The communication takes place via existing line structure in the dwelling/building by means of so-called Spread Spectrum Carrier (SSC) signalling. For this purpose, between the processor unit 15 and the mains (220V), there are connected an output amplifier 27 and an SSC chip 28 for transferring the control signals or messages of the processor unit to the function nodes. The messages are transmitted in a low-level command language called CAL (Common Application Language, ANSI/EIA-600).

The software of the master is stored in the read only memory (ROM) 16, and the variable data which are either given by the end user or obtained from the external sensors, are stored in the random access memory (RAM). The master acts from the set of rules in the software program stored in the read only memory, and the input signals sent from the random access memory, and this results in that one or more messages/commands are sent from the master onto the line system. In addition, data for the consumption are stored in the master, so that the evaluation process gone through by the master before an action, also have a basis in the previous consumption pattern in the individual dwelling.

From the life pattern of an end user, for example a water heater has a given energy consumption profile. From this profile and the specifications existing for such a water heater, calculations can be made for the consumption during the twenty-four hours. For example, a tank of 200 l uses about 2000 W when it is switched on. The heating time for cold water to for example 60° C. is about three hours under normal conditions. When the water is heated, it will be above a given temperature for a number of minutes after the tank has been switched off. Such considerations have been made for all electric products which are to be monitored/controlled in the household or dwelling. The high-power products are systemized and the program makes an evaluation of the consumption with reference to the time of the day, asf. Thus, the data in the memory of the main unit are reduced to a system with reference to where and when the various incidents in the system occur.

The software which contains the set of rules for the system, and in which the external variables are inserted, will contribute to the system getting a lower risk in the evaluation process. The evaluations of the master are influenced by the time of the real-time clock, temperature, historical energy consumption and the energy consumption at the moment. These parameters affect the program which then effects one or more actions. The different loads are regulated from the program which is stored in the firmware program stored in the read only memory (ROM). The read only memory stores firmware controlling the program and executing the action, and it contains also other important information for control. The random access memory (RAM) stores the temperature and the energy consumption over time, which is also included in the evaluation process.

If it is desirable or of interest, the master 10 may also be arranged to receive external signals as additional parameters for control of the system.

Figure 6:
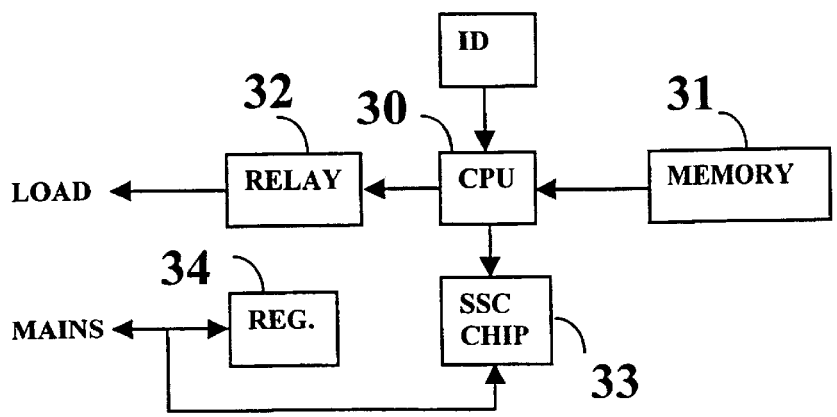
FIG. 6 shows a block diagram of a function node in the system.

FIG. 6 shows a block diagram of a function node 4 or 5 in FIG. 3. As appears, the node contains a processor unit (CPU) 30 capable of sending and receiving signals so that the node is an intelligent unit. Similarly to the master, each node has a quite special identity "ID" or address. The system has totally 64000 addresses, something which dictates that there may be 64000 electric units that can be controlled in a system.

To the processor unit 30 there is connected a memory 31 assisting the node in remembering condition, functional range and so-called CEBus context. ("CEBus" designates the type of network used in the system to see to it that each individual end user may communicate via the mains.) The processor unit 30 also controls a relay 32 causing the node to be able to connect a load of up to 16A. The node communicates on the mains in the same manner as the master, and for this purpose the CPU unit is connected to the mains via an SSC chip 33. The node is also shown to contain a regulator 34 for current supply.

The main unit or master of the system in practice is mounted in the fuse box in the building where the system is to be installed. Since the command signals are transmitted over the mains, it is not necessary with new installations in the form of new lines. In the contact point in which the electric unit to be controlled is plugged in, there is installed a node (receiver) which is to regulate when the product is to be on or off, or is to be regulated in another manner. This node is encapsulated and may be installed in a concealed mounting in the building, or it may be mounted as a plug-in unit (i.e. the node is plugged into the contact point, and the electric product is plugged into the node).

As will be appreciated from the preceding description, the heart of the invention is the "electronic power limiter" which enables load control or release of power by means of coordination of all information which is put into the system and which is controlled by means of the set of rules which has been set up and which forms part of the system software and is stored in the main unit (master).

The software will be able to be prepared by a person skilled in the art when the relevant set of rules and the remaining operational conditions of the system have been settled. The software together with the above-mentioned parameter data which are put in during operation of the system, enables the main unit to carry out a number of advantageous functions and operations during operation. Thus, in a suitable embodiment, the main unit is arranged to control connection and disconnection of power-consuming units in chosen intervals according to accidental circumstances when the power consumption is normal. It is also appropriate that the main unit, when the power consuming unit is connected under high load, provides for direct disconnection of another unit under given circumstances.

What is claimed is:

1. An electronic system for controlling power consumption at a user of electric power, especially a dwelling or household supplied with power from a power plant, comprising a control unit (10) installed at the user and having a programmable memory (16) for storage of data for controlling the power consumption, parameter-sensing sensors (1, 2, 3, . . . ) for the supply of input signals to the control unit, an electric meter (11) communicating with the control unit (10) for measuring the total instantaneous consumption of the user, and a number of addressable function nodes (4, 5, 6) connected between the control unit (10) and the various loads (12) and being in both-way communication with the control unit, for connection and disconnection of power-consuming units under the control thereof, the memory (16) of the control unit (10) containing a program for controlling the power consumption based on an estimate of the instantaneous consumption, and the control unit (10) being arranged to transmit addressed messages to the function nodes (4, 5, 6), so that only the nodes with the correct address receive the current messages and execute load-affecting actions based on the message content, to thereby reduce the instantaneous consumption, CHARACTERIZED IN that the control unit (10) is a main unit arranged to control the power consumption also based on an estimate of a historical consumption pattern at the user, so that the instantaneous consumption is reduced both in the periods in which the power load at the user is highest, and in the periods in which the historical consumption pattern of the user dictates that there is a high load, and that the main unit (10) is arranged to distribute the power consumption by means of a random function distributing the connection of the power-consuming units (12) over a given time interval, the random function being independent of energy plants and other users.

2. A system according to claim 1, CHARACTERIZED IN that the main unit (10) is arranged to control connection and disconnection of power-consuming units (12) in chosen intervals according to accidental circumstances when the power consumption is normal.

3. A system according to claim 1, CHARACTERIZED IN that the main unit (10), when a power-consuming unit (12) is connected under high load, provides for direct disconnection of another unit under given circumstances.

4. A system according to claim 1, CHARACTERIZED IN that the main unit (10) and the function nodes (4, 5, 6) are arranged to carry out connection and disconnection of the power-consuming units (12) in dependence on different priority levels.

5. A system according to claim 1, CHARACTERIZED IN that the main unit (10) is arranged to receive external signals as additional parameters for control of the system.

* * * * *